United States Patent
Lee

(10) Patent No.: US 9,671,638 B2
(45) Date of Patent: Jun. 6, 2017

(54) HIGH-ACCURACY IN-CELL TOUCH PANEL STRUCTURE OF NARROW BORDER

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 392 days.

(21) Appl. No.: 14/333,388

(22) Filed: Jul. 16, 2014

(65) Prior Publication Data

US 2015/0022737 A1 Jan. 22, 2015

(30) Foreign Application Priority Data

Jul. 17, 2013 (TW) .............................. 102213481 A

(51) Int. Cl.
- *G02F 1/1335* (2006.01)
- *G02F 1/1333* (2006.01)
- *G06F 3/041* (2006.01)
- *G06F 3/044* (2006.01)
- *G02F 1/1362* (2006.01)

(52) U.S. Cl.
CPC .......... *G02F 1/13338* (2013.01); *G06F 3/044* (2013.01); *G06F 3/0412* (2013.01); *G06F 3/0416* (2013.01); *G02F 2001/13629* (2013.01); *G06F 2203/04111* (2013.01)

(58) Field of Classification Search
CPC .............................. G02F 1/13338; G06F 3/044
USPC ............................................ 349/12; 345/174
See application file for complete search history.

(56) References Cited

U.S. PATENT DOCUMENTS

2013/0265276 A1* 10/2013 Obeidat .................. G06F 3/044
                                                          345/174

* cited by examiner

*Primary Examiner* — Thanh-Nhan P Nguyen
(74) *Attorney, Agent, or Firm* — Muncy, Geissler, Olds & Lowe, P.C.

(57) ABSTRACT

A high-accuracy in-cell touch panel structure of narrow border includes an upper substrate, a lower substrate, a liquid crystal layer configured between the upper and lower substrates, a thin film transistor layer, a sensing electrode layer, and a black matrix layer. The thin film transistor layer includes a plurality of gate lines, a plurality of source lines, and a plurality of first conductor line units arranged in a first direction. The sensing electrode layer includes plural second conductor line units and plural connection lines arranged in a second direction. The plurality of first conductor line units and the plurality of second conductor line units form a sensing touch pattern structure for sensing an approaching external object. The plurality of first conductor line units and the plurality of second conductor line units are disposed corresponding to positions of the plurality of gate lines and the plurality of source lines.

25 Claims, 13 Drawing Sheets

HIGH-ACCURACY IN-CELL TOUCH PANEL STRUCTURE OF NARROW BORDER

BACKGROUND OF THE INVENTION

1. Field of the Invention

The present invention relates to the technical field of touch panels and, more particularly, to a high-accuracy in-cell touch panel structure of narrow border.

2. Description of Related Art

Modern consumer electronic apparatuses are typically equipped with touch panels for use as their input devices. According to different sensing manners, the touch panels can be classified into resistive type, capacitive type, acoustic type, optical type and other type.

The principle of touch panels is based on different sensing manners to detect a voltage, current, acoustic wave, or infrared to thereby detect the coordinates of touch points on a screen where a finger or other medium touches. For example, a resistive touch panel uses a potential difference between the upper and lower electrodes to compute the position of a pressed point for detecting the location of the touch point, and a capacitive touch panel uses a capacitance change generated in an electrostatic combination of the arranged transparent electrodes with a human body to generate a current or voltage for detecting touch coordinates.

With the widespread use of smart phones, the multi-touch technique is getting more and more important. Currently, the multi-touch is implemented by projected capacitive touch technique.

The projected capacitive touch technique makes use of two layers of indium tin oxide (ITO) to form a matrix of sensing units arranged in intersected columns and rows, so as to detect precise touch positions. The projected capacitive touch technique is based on capacitive sensing, wherein it designs plural etched ITO electrodes and adds plural sets of transparent conductor lines that are on different planes and vertical with each other to form X-axis and Y-axis driving lines. These conductor lines are all controlled by a controller for being sequentially scanned to detect capacitance changes that are sent to the controller.

FIG. 1 is a schematic diagram of a prior touch panel structure 100. On the prior touch panel structure 100, the sensing conductor lines 110, 120 are arranged in the second direction (Y-direction) and in the first direction (X-direction). When a touch sensing is being performed and the sensing conductor lines 120 have to transmit the sensed signals to the control circuit 131 on a flexible circuit board 130, a great amount of wires at the side of the panel 140 is required for connection to the flexible circuit board 130. Such a prior design increases the border width of the touch panel and thus is not suitable for the trend of narrow border.

Therefore, it is desirable to provide an improved touch panel device to mitigate and/or obviate the afore-mentioned problems.

SUMMARY OF THE INVENTION

The object of the present invention is to provide a high-accuracy in-cell touch panel structure of narrow border, which not only can significantly increase the light penetrability of a touch panel but also can greatly save the material cost and the manufacturing cost, and which is suitable for narrow border design in comparison with the prior art.

According to a feature of the invention, there is provided a high-accuracy in-cell touch panel structure of narrow border, which comprises: an upper substrate; a lower substrate parallel to the upper substrate; a liquid crystal layer configured between the upper substrate and the lower substrates; a thin film transistor layer disposed at one side of the lower substrate facing the liquid crystal layer, the thin film transistor layer including a plurality of gate lines, a plurality of source lines, and N first conductor line units arranged in a first direction, wherein N is a positive integer; for driving a corresponding pixel driving circuit according to a display pixel signal and a display driving signal; a sensing electrode layer disposed at one side of the thin film transistor layer facing the liquid crystal layer, the sensing electrode layer having M second conductor line units and N connection lines arranged in a second direction (Y-direction) for sensing an approaching external object, where M and N are each a positive integer, wherein each of the N first conductor line units makes use of a corresponding i-th connection line to be extended to one edge of the high-accuracy in-cell touch panel structure of narrow border, where i is a positive integer and 1≤i≤N, and the N first conductor line units, the M second conductor line units, and the N connection lines are disposed corresponding to positions of the plurality of gate lines and source lines.

According to another feature of the invention, there is provided a high-accuracy in-cell touch panel structure of narrow border, which comprises: an upper substrate; a lower substrate parallel to the upper substrate; an OLED layer configured between the upper substrate and the lower substrate; a thin film transistor layer disposed at one side of the lower substrate facing the OLED layer, the thin film transistor layer including a plurality of gate lines, a plurality of source lines, and N first conductor line units arranged in a first direction, wherein N is a positive integer; for driving a corresponding pixel driving circuit according to a display pixel signal and a display driving signal; a sensing electrode layer disposed at one side of the thin film transistor layer facing the OLED layer, the sensing electrode layer having M second conductor line units and N connection lines arranged in a second direction for sensing an approaching external object, where M and N are each a positive integer; a cathode layer disposed at one side of the upper substrate facing the OLED layer; and an anode layer disposed at one side of the thin film transistor layer facing the OLED layer, the anode layer including a plurality of anode pixel electrodes, each of the plurality of anode pixel electrodes being connected to a source or drain of a corresponding pixel driving transistor; wherein each of the N first conductor line units makes use of a corresponding i-th connection line to be extended to one edge of the high-accuracy in-cell touch panel structure of narrow border, where i is a positive integer and 1≤i≤N, and the N first conductor line units, the M second conductor line units, and the N connection lines are disposed corresponding to positions of the plurality of gate lines and source lines.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
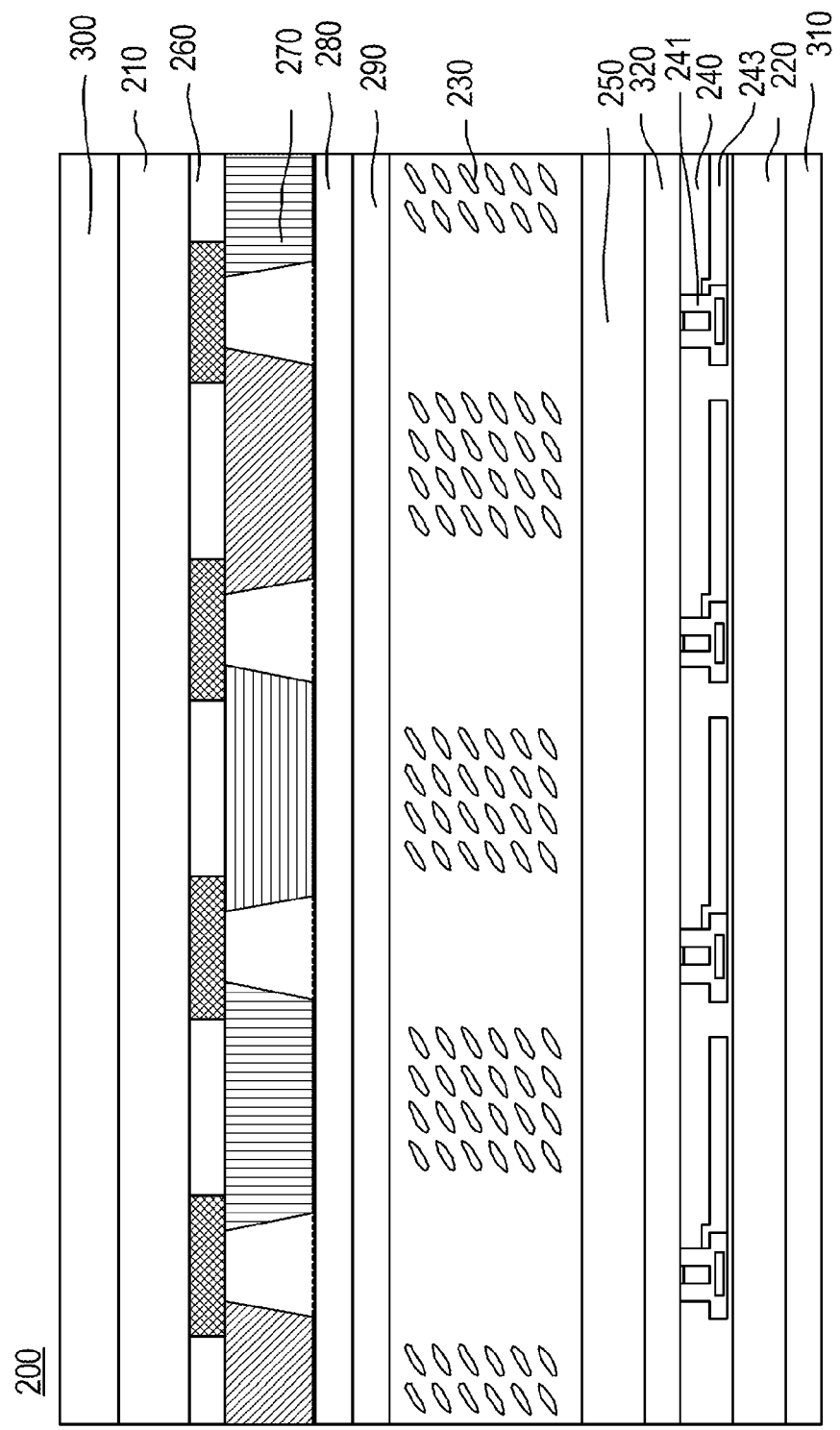
FIG. 2 is a stackup diagram of the high-accuracy in-cell touch panel structure of narrow border in accordance with an embodiment the present invention.

The present invention relates to a high-accuracy in-cell touch panel structure of narrow border. FIG. 2 is a stackup diagram of the high-accuracy in-cell touch panel structure of narrow border 200 in accordance with an embodiment of the present invention. As shown, the high-accuracy in-cell touch panel structure of narrow border 200 includes an upper substrate 210, a lower substrate 220, a liquid crystal layer 230, a thin film transistor layer 240, a sensing electrode layer 250, a black matrix layer 260, a color filter layer 270, an over coat layer 280, a common electrode (Vcom) layer 290, a first polarizer layer 300, a second polarizer layer 310, and a insulation layer 320.

The upper substrate 210 and the lower substrate 220 are parallel to each other. The liquid crystal layer 230 is disposed between the upper and lower substrates 210, 220.

In the present invention, the sensing electrode layer 250 is disposed at one side of the thin film transistor layer 240 that faces the liquid crystal layer 230. On the thin film transistor layer 240, there are N first conductor line units 50-1, 50-2, . . . , 50-N arranged along a second direction (Y-direction), each being arranged in a first direction (X-direction). On the sensing electrode layer 250, there are M second conductor line units 40-1, 40-2, . . . , 40-M and N connection lines 41-1, 41-2, . . . , 41-N arranged along the first direction, each being arranged in the second direction, where M and N are each a positive integer, so as to form a sensing touch pattern structure as shown in FIG. 3.

Figure 3:
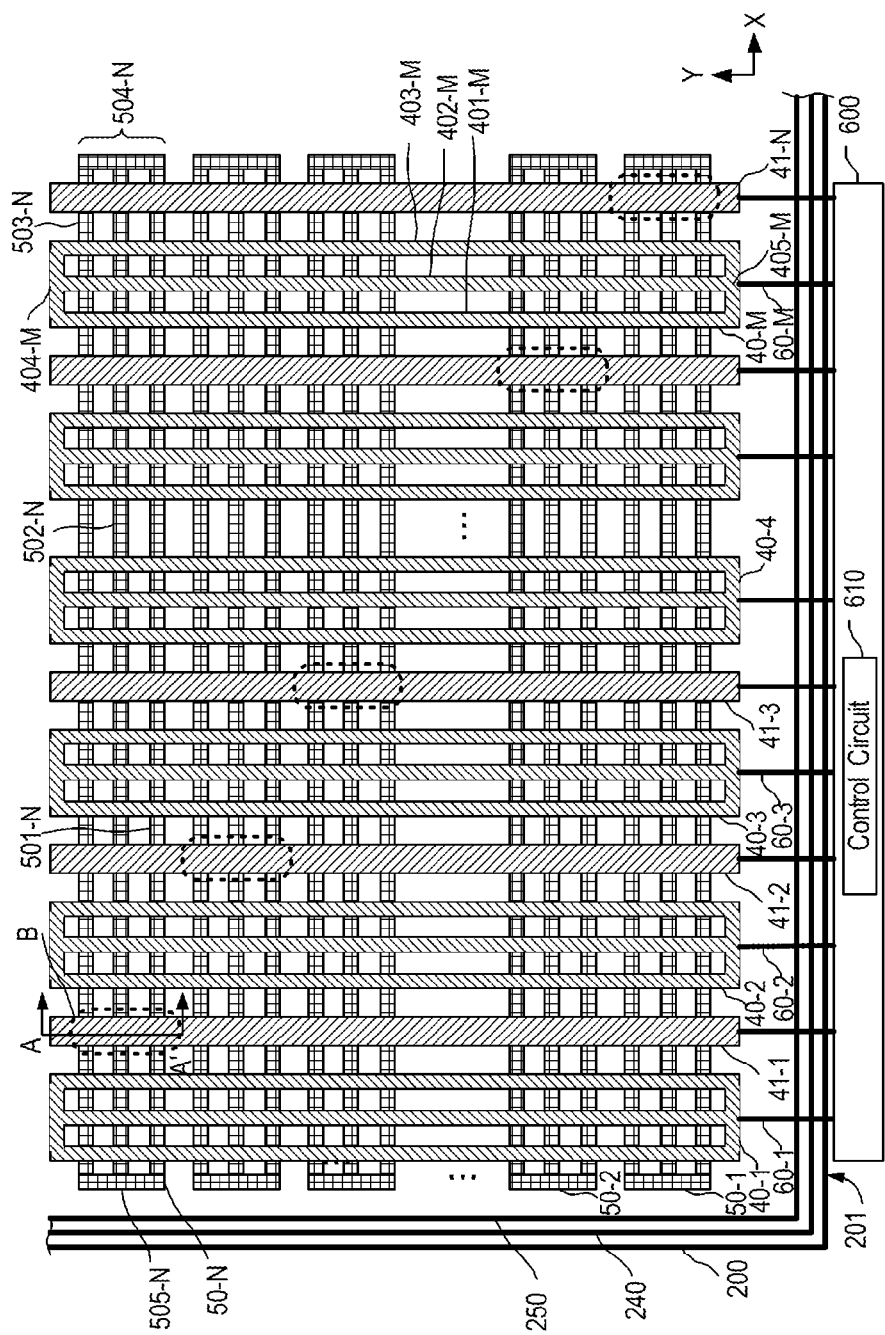
FIG. 3 schematically illustrates the sensing electrode layer and the thin film transistor layer in accordance with the present invention.

FIG. 3 schematically illustrates the sensing electrode layer 250 and the thin film transistor layer 240 in accordance with the present invention. As shown in FIG. 3, the thin film transistor layer 240 is disposed at one side of the lower substrate 220 that faces the liquid crystal layer 230. The thin film transistor layer 240 includes a plurality of gate lines (not shown), a plurality of source lines (not shown), and N first conductor line units 50-1, 50-2, . . . , 50-N arranged in a first direction. The thin film transistor layer 240 further includes a plurality of pixel driving circuits. Each pixel driving circuit drives a corresponding pixel driving transistor according to a display pixel signal and a display driving signal. The thin film transistor layer 240 further includes thin film transistors 241 and transparent electrodes 243.

The sensing electrode layer 250 is disposed at one side of the thin film transistor layer 240 that faces the liquid crystal layer 230. The sensing electrode layer 250 includes M second conductor line units 40-1, 40-2, . . . , 40-M and N connection lines 41-1, 41-2, . . . , 41-N arranged in the second direction, where M and N are each a positive integer. The M second conductor line units 40-1, 40-2, . . . , 40-M and the N first conductor line units 50-1, 50-2, . . . , 50-N are configured for sensing an approaching external object according to a touch driving signal. The M second conductor line units 40-1, 40-2, . . . , 40-M, the N connection lines 41-1, 41-2, . . . , 41-N and the N first conductor line units 50-1, 50-2, . . . , 50-N are made of conductive metal material.

Each of the N first conductor line units 50-1, 50-2, . . . , 50-N makes use of a corresponding i-th connection line of the N connection lines 41-1, 41-2, . . . , 41-N to be extended to one edge 201 of the high-accuracy in-cell touch panel structure of narrow border 200, where i is a positive integer and 1≤i≤N. Each of the M second conductor line units 40-1, 40-2, . . . , 40-M is extended to the same edge 201 of the high-accuracy in-cell touch panel structure of narrow border 200 through a corresponding metal wire for being further connected to a flexible circuit board 600.

The N first conductor line units 50-1, 50-2, . . . , 50-N, the M second conductor line units 40-1, 40-2, . . . , 40-M, and the N connection lines 41-1, 41-2, . . . , 41-N are disposed at positions corresponding to the positions of the plurality of gate lines and the plurality of source lines.

As shown in FIG. 3, each of the M second conductor line units 40-1, 40-2, . . . , 40-M is composed of plural slender metal sensing lines, and each of the N first conductor line units 50-1, 50-2, . . . , 50-N is composed of plural slender metal sensing lines. For example, the second conductor line unit 40-M is composed of three metal sensing lines 401-M, 402-M and 403-M arranged along the first direction, each being arranged in the second direction. The three metal sensing lines 401-M, 402-M and 403-M are connected by metal sensing lines 404-M and 405-M at two ends, respectively. The first conductor line unit 50-N is composed of three metal sensing lines 501-N, 502-N and 503-N arranged along the second direction, each being arranged in the first direction. The three metal sensing lines 501-N, 502-N and 503-N are connected by metal sensing lines 504-N and 505-N at two ends, respectively. In FIG. 3, the three metal sensing lines 501-N, 502-N and 503-N of the first conductor line unit 50-N are composed of plural line segments in implementation, which will be explained in more detail in FIG. 9.

The M second conductor line units 40-1, 40-2, . . . , 40-M and the N first conductor line units 50-1, 50-2, . . . , 50-N are not electrically connected with each other. Preferably, an insulation layer 320 may be arranged between the sensing electrode layer 250 and the thin film transistor layer 240. Alternatively, it is also applicable to arrange insulation traces or insulation blocks in-between the intersections of the M second conductor line units 40-1, 40-2, . . . , 40-M and the N first conductor line units 50-1, 50-2, . . . , 50-N.

The plural metal sensing lines of each of the M second conductor line units 40-1, 40-2, . . . , 40-M form a quadrilateral region, and the plural metal sensing lines of each of the N first conductor line units 50-1, 50-2, . . . , 50-N also form a quadrilateral region. The metal sensing lines in each quadrilateral region are electrically connected together, while any two of the quadrilateral regions are not connected with each other. The quadrilateral region has a shape of rectangle or square. The first direction is perpendicular to the second direction.

Each of the N connection lines 41-1, 41-2, . . . , 41-N is disposed between two second conductor line units (40-1, 40-2, . . . , 40-M).

The metal sensing lines in each quadrilateral region formed by the plural metal sensing lines of each of the M second conductor line units 40-1, 40-2, . . . , 40-M and the N first conductor line units 50-1, 50-2, . . . , 50-N are made of conductive metal material or alloy material. The conductive metal material is selectively to be chromium, barium, aluminum, silver, copper, titanium, nickel, tantalum, cobalt, tungsten, magnesium, calcium, potassium, lithium, indium, or a mixture of LiF, MgF2 or Li2O.

As shown in FIG. 3, each of the N first conductor line units 50-1, 50-2, . . . , 50-N is electrically connected with a corresponding connection line (41-1, 41-2, . . . , 41-N) at a position denoted by a dotted ellipse, and each of the N connection lines 41-1, 41-2, . . . , 41-N is extended to the same edge 201 of the high-accuracy in-cell touch panel structure of narrow border 200 through a corresponding metal wire for being further connected to the flexible circuit board 600. Each of the M second conductor line units 40-1, 40-2, . . . , 40-M is extended to the same edge 201 of the high-accuracy in-cell touch panel structure of narrow border 200 through a corresponding metal wire 60-1, 60-2, . . . , 60-M for being further connected to the flexible circuit board 600.

The surface of the high-accuracy in-cell touch panel structure of narrow border 200 is provided to receive at least one touch point. There is further provided with a control circuit 610 which is electrically connected to the M second conductor line units 40-1, 40-2, . . . , 40-M and the N first conductor line units 50-1, 50-2, . . . , 50-N via the flexible circuit board 600.

The M second conductor line units 40-1, 40-2, . . . , 40-M and the N first conductor line units 50-1, 50-2, . . . , 50-N correspondingly generate a sensing signal in response to the position and magnitude of a finger's touch on at least one touch point of the high-accuracy in-cell touch panel structure of narrow border 200. The control circuit 610 is electrically connected to the M second conductor line units 40-1, 40-2, . . . , 40-M and the N first conductor line units 50-1, 50-2, . . . , 50-N via the flexible circuit board 600, so as to calculate the coordinate of the at least one touch point based on the sensing signal.

Figure 4:
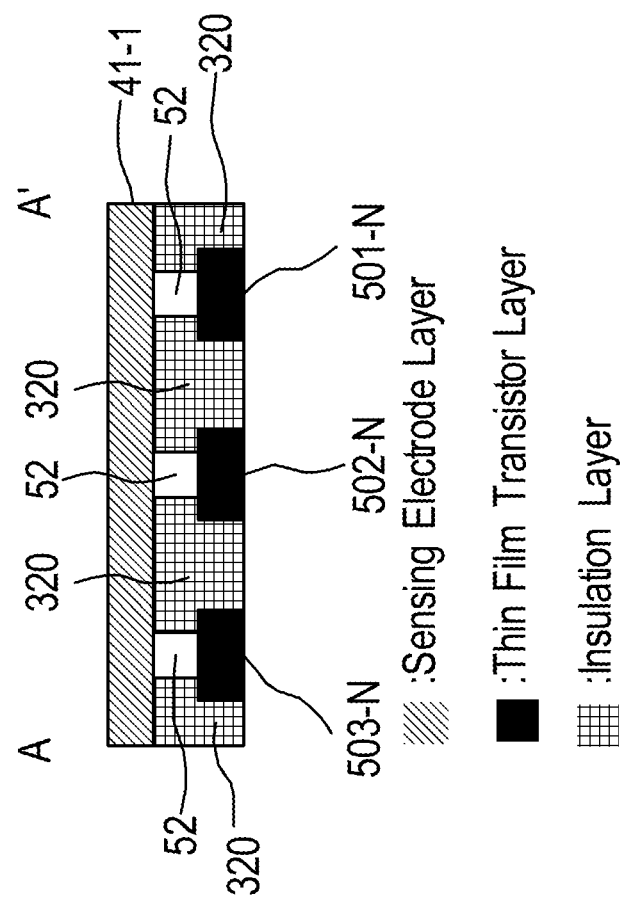
FIG. 4 is a cross sectional view taking along A-A' line of FIG. 3.

FIG. 4 is a cross sectional view taking along A-A' line of FIG. 3. As shown in FIG. 4, the first conductor line unit 50-N is connected with the connection line 41-1 at the position denoted by the dotted ellipse B of FIG. 3. With reference to FIGS. 2 and 4, the insulation layer 320 is arranged between the sensing electrode layer 250 and the thin film transistor layer 240, and the first conductor line unit 50-N is electrically connected to the connection line 41-1 through a via 52 that passes through the insulation layer 320. That is, with the connection line 41-1, the first conductor line unit 50-N is able to transmit the sensed signal to the control circuit 610.

Figure 5:
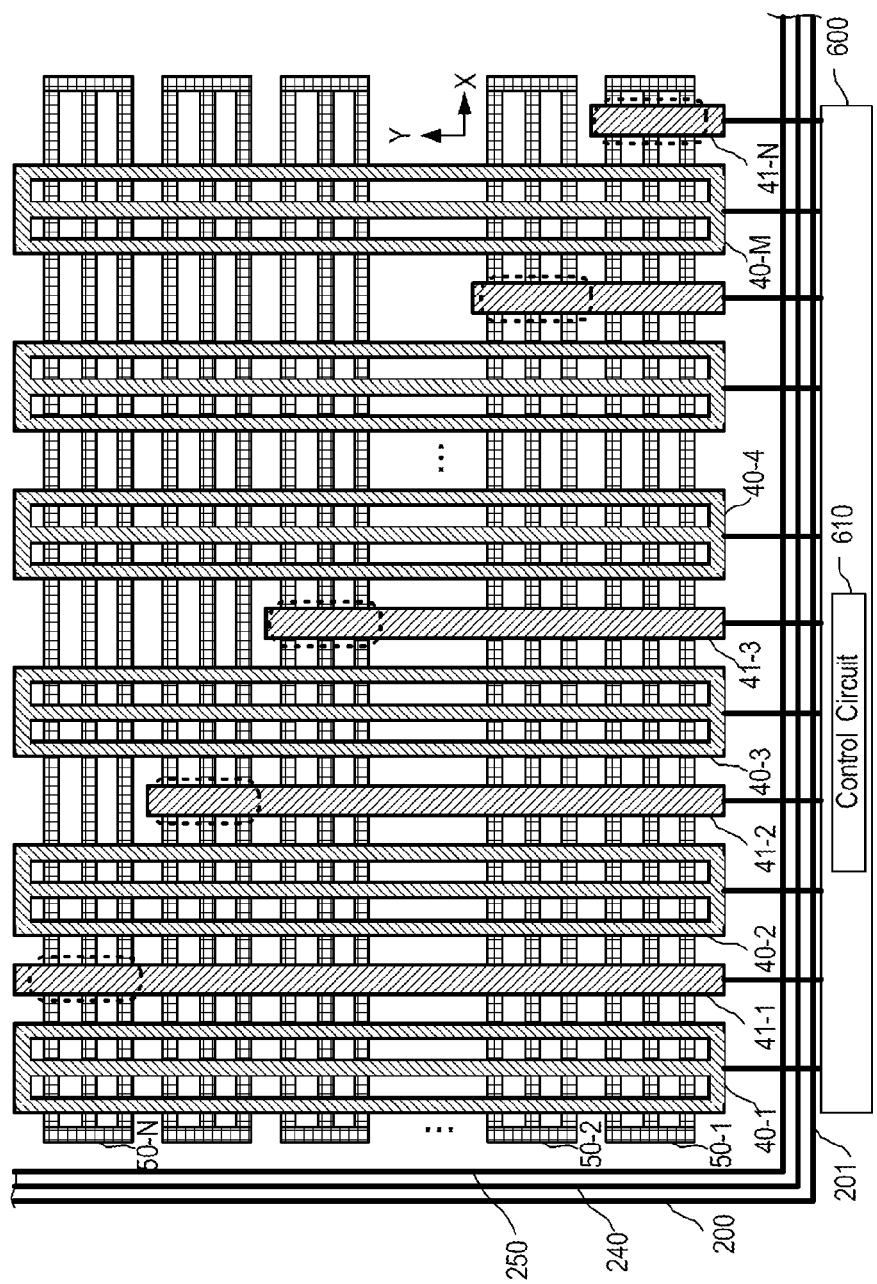
FIG. 5 is a schematic diagram of a high-accuracy in-cell touch panel structure of narrow border in accordance with the present invention.

FIG. 5 is a schematic diagram of a high-accuracy in-cell touch panel structure of narrow border 200 according to another embodiment of the present invention, which is similar to FIG. 3 except that the N connection lines 41-1, 41-2, . . . , 41-N have different lengths. As shown, the lengths of the N connection lines 41-1, 41-2, . . . , 41-N are gradually decreased in this embodiment.

Figure 6:
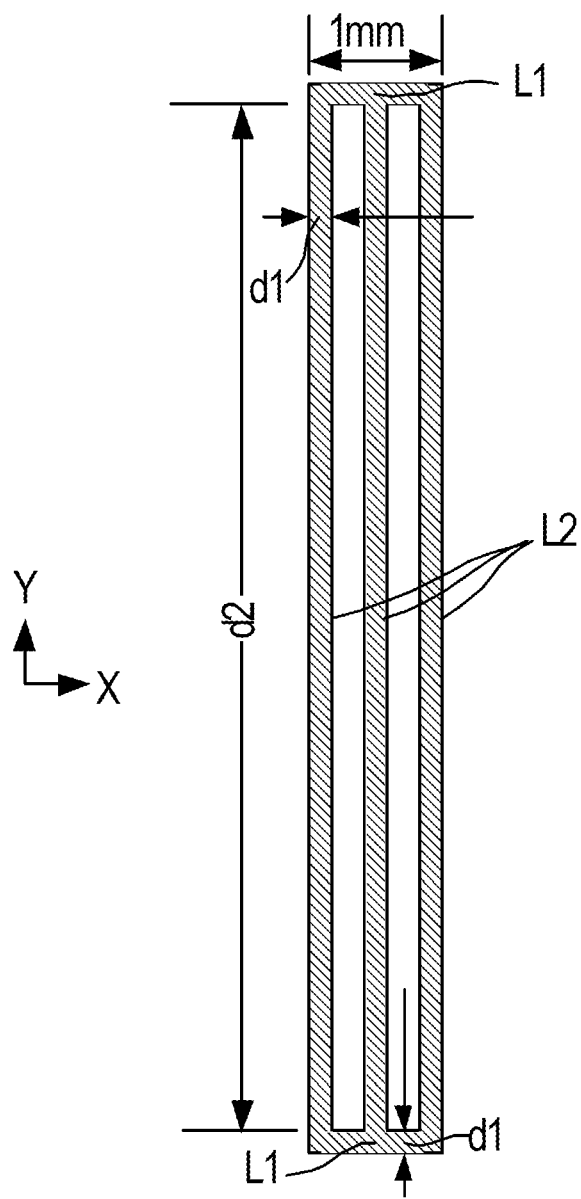
FIG. 6 is a schematic diagram of a second conductor line unit.

FIG. 6 is a schematic diagram of a second conductor line unit (40-1, 40-2, . . . , 40-M). As shown, the quadrilateral region is a rectangle composed of three metal sensing lines L2 in the second direction and two metal sensing lines L1 in a first direction. The three metal sensing lines L2 are connected by metal sensing lines L1 at two ends, respectively. In other embodiments, the number of metal sensing lines can be varied according to the actual requirement.

Figure 7:
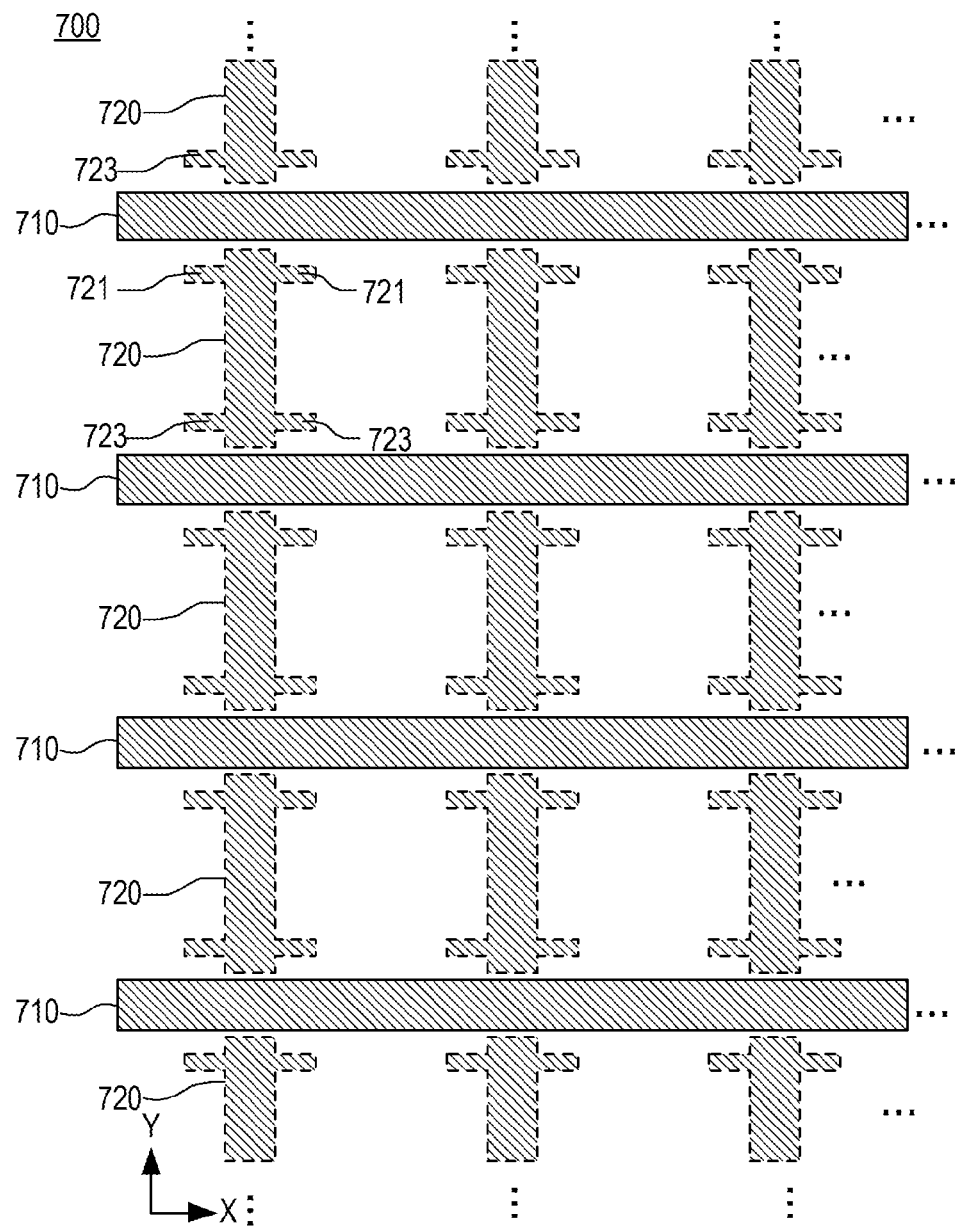
FIG. 7 schematically illustrates the gate line sub-layer in accordance with the present invention.

In the present invention, the N first conductor line units 50-1, 50-2, . . . , 50-N are disposed in the thin film transistor layer 240. The thin film transistor layer 240 includes a gate line sub-layer and a source line sub-layer. FIG. 7 schematically illustrates the gate line sub-layer 700 in accordance with the present invention. The gate line sub-layer 700 has a plurality of gate lines 710 and a plurality of wiring segments 720. The plurality of gate lines 710 are arranged in the first direction (X-direction) and the plurality of wiring segments 720 are arranged in the second direction (Y-direction), wherein the plurality of wiring segments 720 arranged in the second direction are separated by the plurality of gate lines 710. Each of the plurality of wiring segments 720 arranged in the second direction includes two ends respectively having a first extension part 721 and a second extension part 723 arranged in the first direction and extended toward two sides of the wiring segment 720, in which the first direction is substantially vertical with the second direction. It is noted that FIG. 7 only shows the possible positions where the plurality of wiring segments 720 arranged in the second direction can be disposed. In actual arrangement of wirings, it is possible that only part of the positions, but not all positions, is disposed with the wiring segments 720, and thus the plurality of wiring segments 720 in FIG. 7 are shown by dotted lines.

Figure 8:
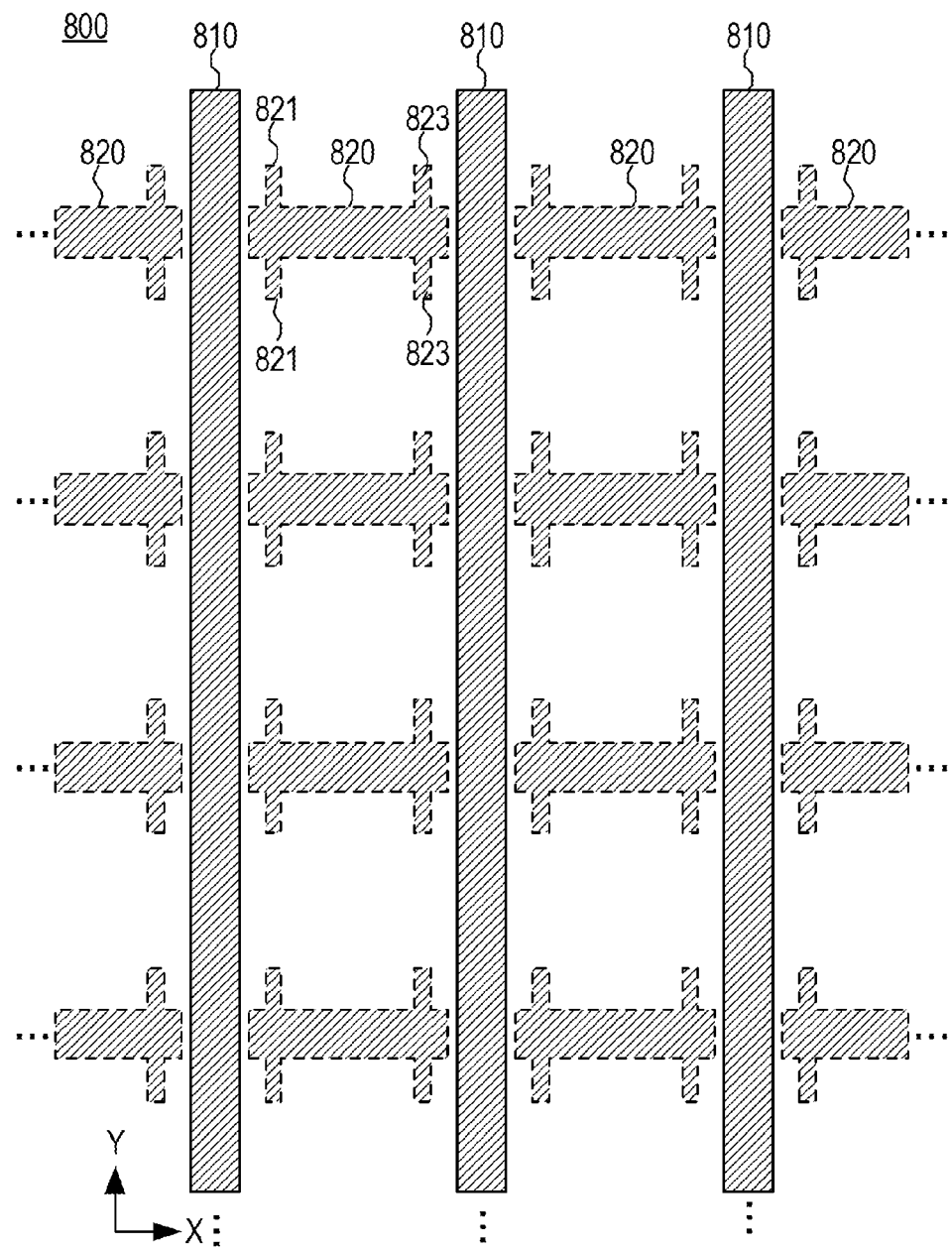
FIG. 8 schematically illustrates the source line sub-layer in accordance with the present invention.

FIG. 8 schematically illustrates the source line sub-layer 800 in accordance with the present invention. The source line sub-layer 800 is disposed at one side of the gate line sub-layer 700 facing the liquid crystal layer 230 and has a plurality of source lines 810 and a plurality of wiring segments 820. The plurality of source lines 810 are arranged in the second direction (Y-direction) and the plurality of wiring segments 820 are arranged in the first direction (X-direction), wherein the plurality of wiring segments 820 arranged in the first direction are separated by the plurality of source lines 810. Each of the plurality of wiring segments 820 arranged in the first direction includes two ends respectively having a first extension part 821 and a second extension part 823 arranged in the second direction (Y-direction) and extended toward two sides of the wiring segment 820.

As shown in FIG. 7 and FIG. 8, the line width of the wiring segment 820 arranged in the first direction is equal to the line width of the gate line 710, and the line width of the wiring segment 720 arranged in the second direction is equal to the line width of the source line 810. In other embodiments, the line width of the wiring segment 820 arranged in the first direction can be smaller than the line width of the gate line 710, and the line width of the plurality of wiring segment 720 arranged in the second direction can be smaller than the line width of the source line 810.

In the present invention, the plurality of wiring segments 720 arranged in the second direction are disposed at positions same as the positions of the source lines 810 but on different layers. Similarly, the plurality of wiring segments 820 arranged in the first direction are disposed at positions same as the positions of the gate lines 710 but on different layers. In the present invention, the plurality of wiring segments 820 arranged in the first direction and the plurality of wiring segments 720 arranged in the second direction are disposed at positions corresponding to the positions of the plurality of gate lines 710 and the plurality of source lines 810.

Figure 9:
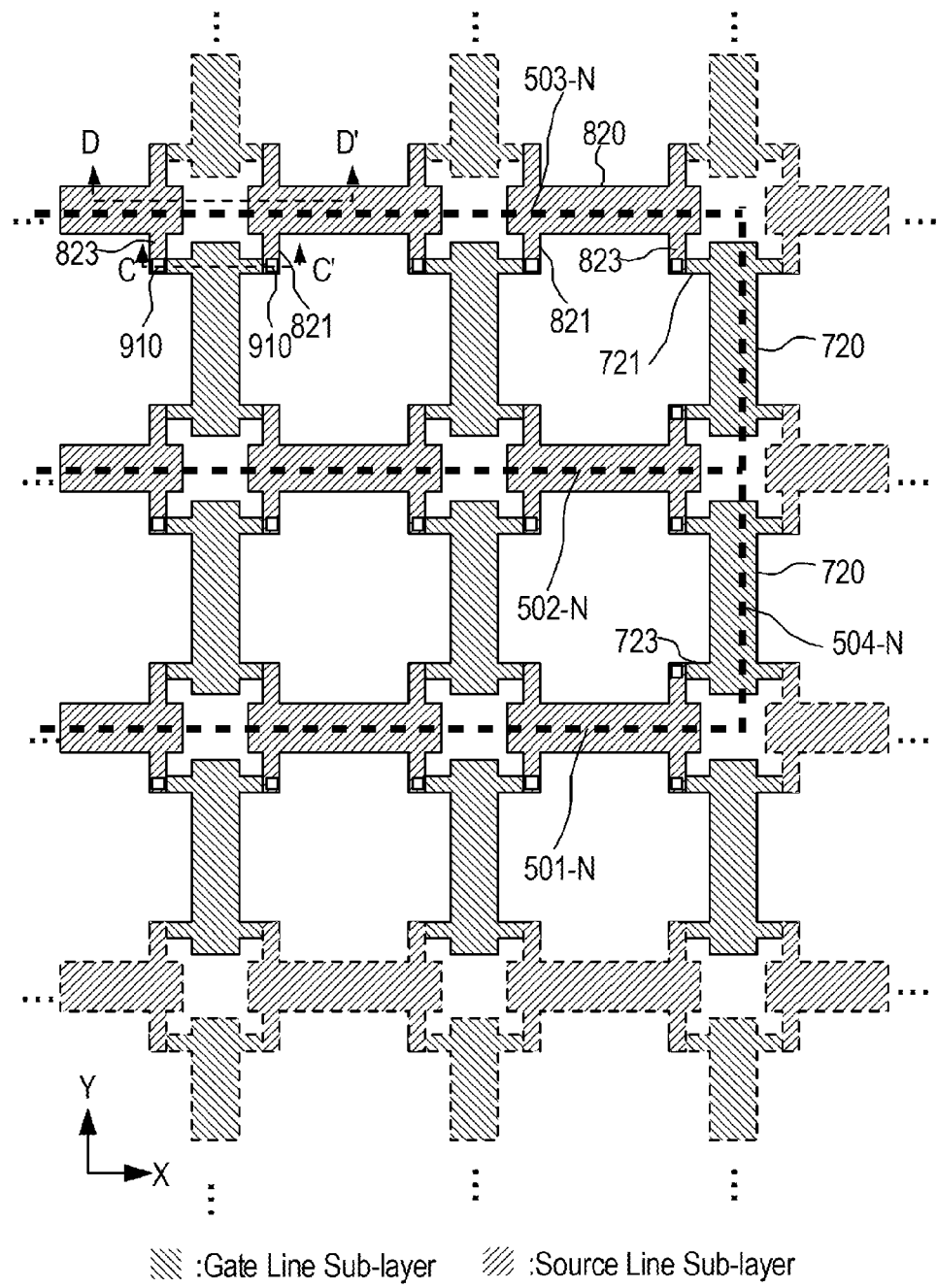
FIG. 9 schematically illustrates the electrical connection between the plurality of wiring segments arranged in the first direction and the plurality of the wiring segments arranged in the second direction in accordance with the present invention.

FIG. 9 schematically illustrates the electrical connection between the plurality of wiring segments 820 and the plurality of the wiring segments 720 in accordance with the present invention, wherein the extension parts 721, 723, 821, 823 are partially overlapped and electrically connected thereby, so as to allow the plurality of wiring segments 820 arranged in the first direction and the plurality of wiring segments 720 arranged in the second direction to form the N first conductor line units 50-1, 50-2, . . . , 50-N of the thin film transistor layer 240. As shown in FIG. 9, there are formed with three metal sensing lines 501-N, 502-N and 503-N arranged in the first direction and a metal sensing lines 504-N arranged in the second direction.

From the aforementioned description, it is known that the plurality of the wiring segments 720 arranged in the second direction and the plurality of wiring segments 820 arranged in the first direction can respectively form a first conductor line unit (50-1, 50-2, . . . , 50-N). That is, the extension parts 721, 723, 821, 823 are partially overlapped and electrically connected thereby, and a set of metal sensing lines (501-N, 502-N, 503-N, 504-N, 505-N) can be formed by the plurality of wiring segments 720 arranged in the second direction and the plurality of wiring segments 820 arranged in the first direction, in which the N first conductor line units 50-1, 50-2, . . . , 50-N can be formed by the set of metal sensing lines (501-N, 502-N, 503-N, 504-N, 505-N). As shown in FIG. 4, the N first conductor line units 50-1, 50-2, . . . , 50-N are electrically connected to the connection lines 41-1, 41-2, . . . , 41-N through the vias 52 that pass through the insulation layer 320 so as to form the sensing conductive lines in the first direction.

Figure 10A:
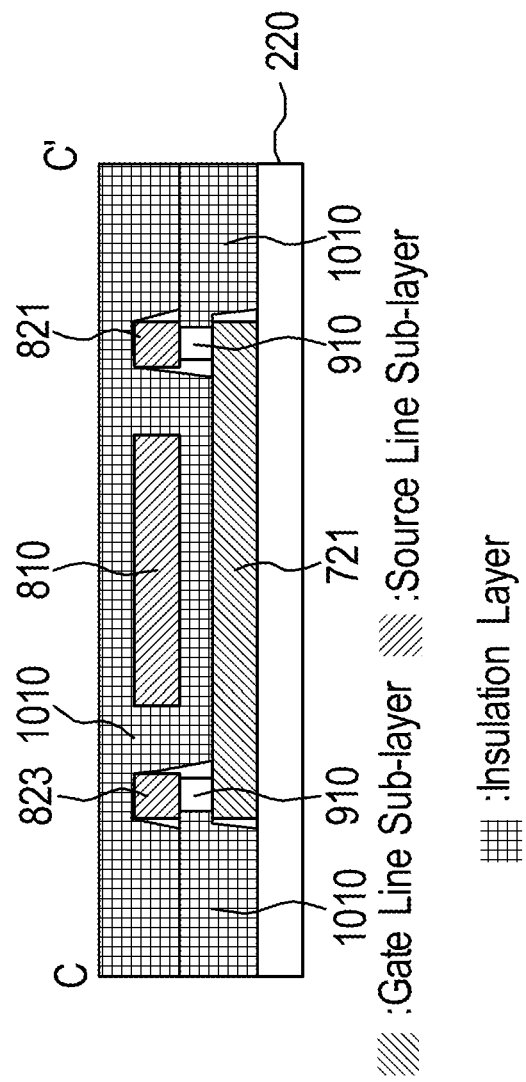
FIG. 10A and FIG. 10B are two cross sectional views taking along C-C' and D-D' lines of FIG. 9.
Figure 10B:
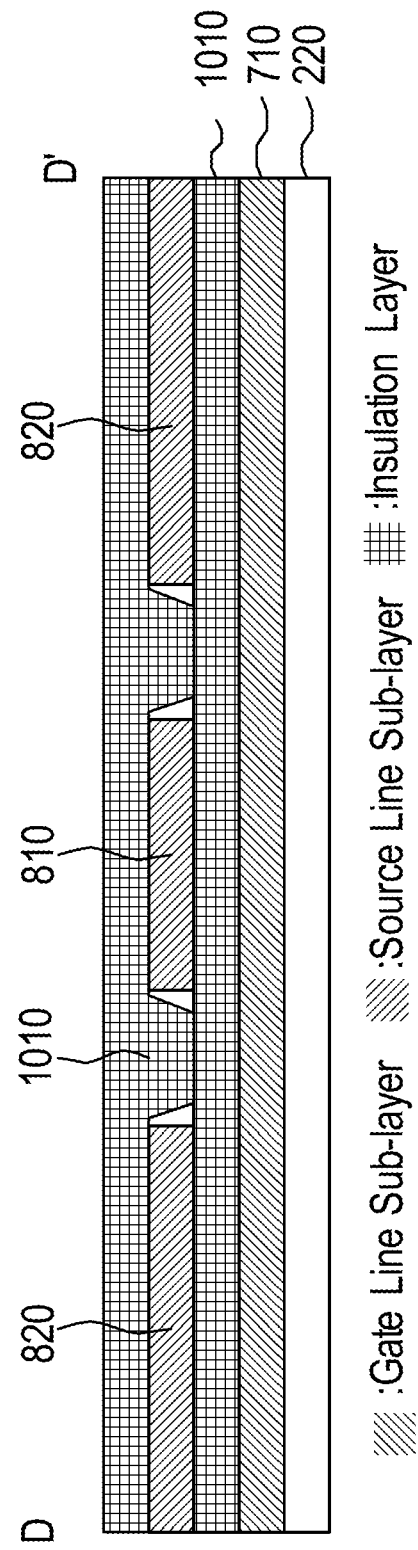

FIG. 10A and FIG. 10B are two cross sectional views taking along C-C' and D-D' lines of FIG. 9, respectively. As shown in FIG. 10A, there is an insulation layer 1010 arranged between the first extension part 721 and the source lines 810. The first extension part 721 of the wiring segment 720 is electrically connected to the first extension part 821 and the second extension part 823 through vias 910. As shown in FIG. 10B, there is an insulation layer 1010 arranged between the gate line 710 and the source line 810. Because of the insulation layer 1010 arranged between the source line 810 and the first extension part 821 and the second extension part 823 arranged in the second direction, the source line 810 is not electrically connected to the wiring segments 820.

Figure 11:
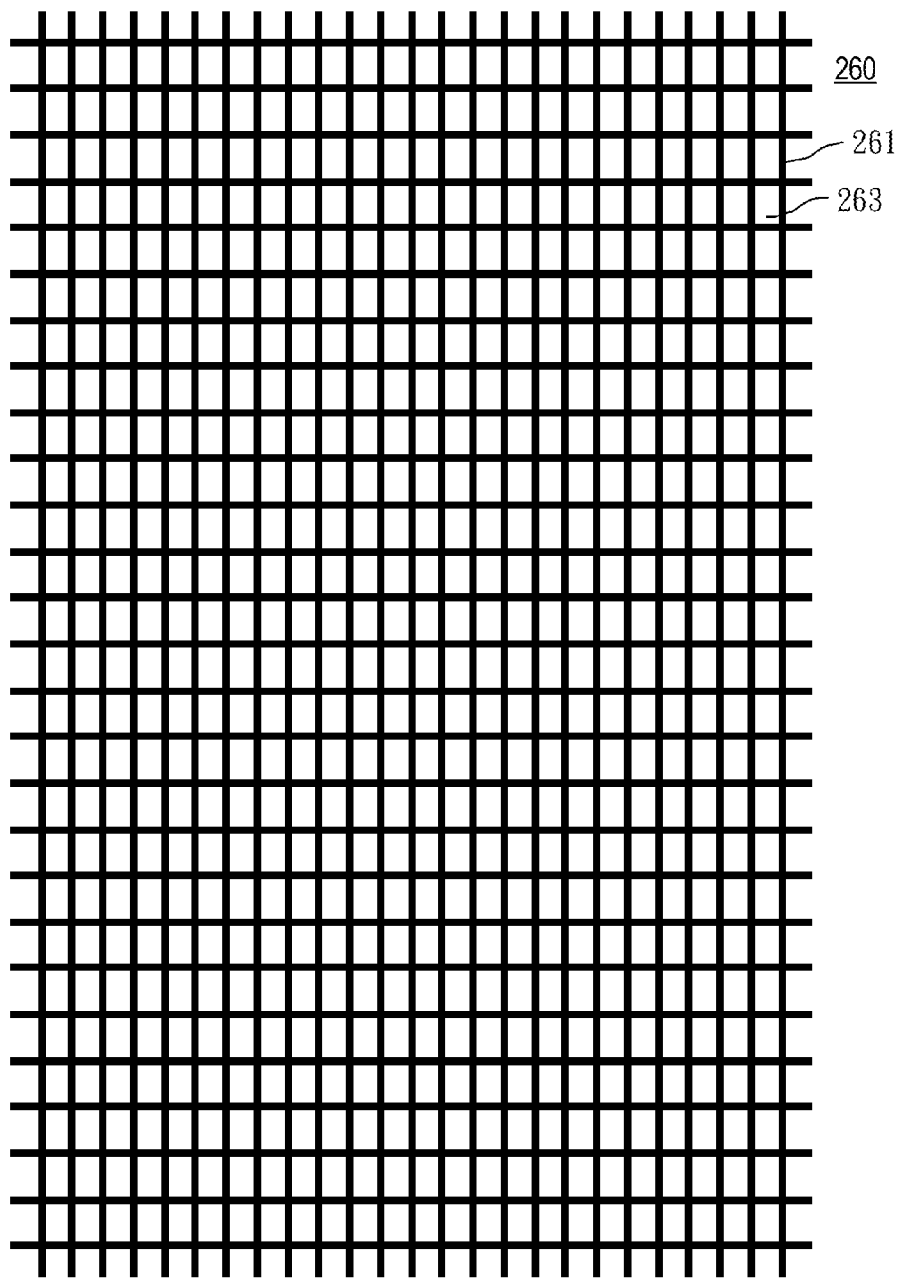
FIG. 11 schematically illustrates the black matrix layer.

The black matrix layer 260 is disposed at one side of the upper substrate 210 that faces the liquid crystal layer 230. The black matrix layer 260 is composed of a plurality of opaque lines. FIG. 11 schematically illustrates the black matrix layer 260, which is the same as that of the known LCD device. As shown in FIG. 11, the black matrix layer 260 is composed of lines of insulating material that are black and opaque for forming the plurality of opaque lines 261. The lines of black insulating material are arranged as a checkerboard pattern, the color filter layer 270 is disposed in the areas 263 among the lines of black insulating material.

In the present invention, the plurality of opaque lines 261 are disposed at positions corresponding to the positions of the plurality of gate lines 710 and the plurality of source lines 810.

With reference to FIG. 6, the line width of metal sensing lines L1 and the metal sensing lines L2 is equal to or smaller than the line width of the gate line 710 or the line width of the source line 810. The M second conductor line units 40-1, 40-2, . . . , 40-M, the N connection lines 41-1, 41-2, . . . , 41-N, and the N first conductor line units 50-1, 50-2, . . . , 50-N are disposed at positions corresponding to the positions of the plurality of gate lines 710 and the plurality of source lines 810.

That is, when viewing from the upper substrate 210 to the lower substrate 220, the M second conductor line units 40-1, 40-2, . . . , 40-M, the N connection lines 41-1, 41-2, . . . , 41-N and the N first conductor line units 50-1, 50-2, . . . , 50-N are disposed at positions corresponding to the positions of the plurality of opaque lines 261 so as to be concealed by the plurality of opaque lines 250, so that users only see the plurality of opaque lines 261 but not the M second conductor line units 40-1, 40-2, . . . , 40-M, the N connection lines 41-1, 41-2, . . . , 41-N and the N first conductor line units 50-1, 50-2, . . . , 50-N. Thus, the light penetration rate is not influenced.

The color filter layer 270 is arranged on one side of the black matrix layer 260 that faces the liquid crystal layer 230. The common electrode layer 290 is disposed between the upper substrate 210 and the lower substrate 220. The over coat layer 280 is arranged on one side of the color filter layer 270 facing the liquid crystal layer 230. The first polarizer layer 300 is arranged on one side of the upper substrate 210 opposite to the other side of the upper substrate 210 facing the liquid crystal layer 230. The second polarizer layer 310 is arranged on one side of the lower substrate 220 opposite to the other side of the lower substrate 220 facing the liquid crystal layer 230.

Figure 12:
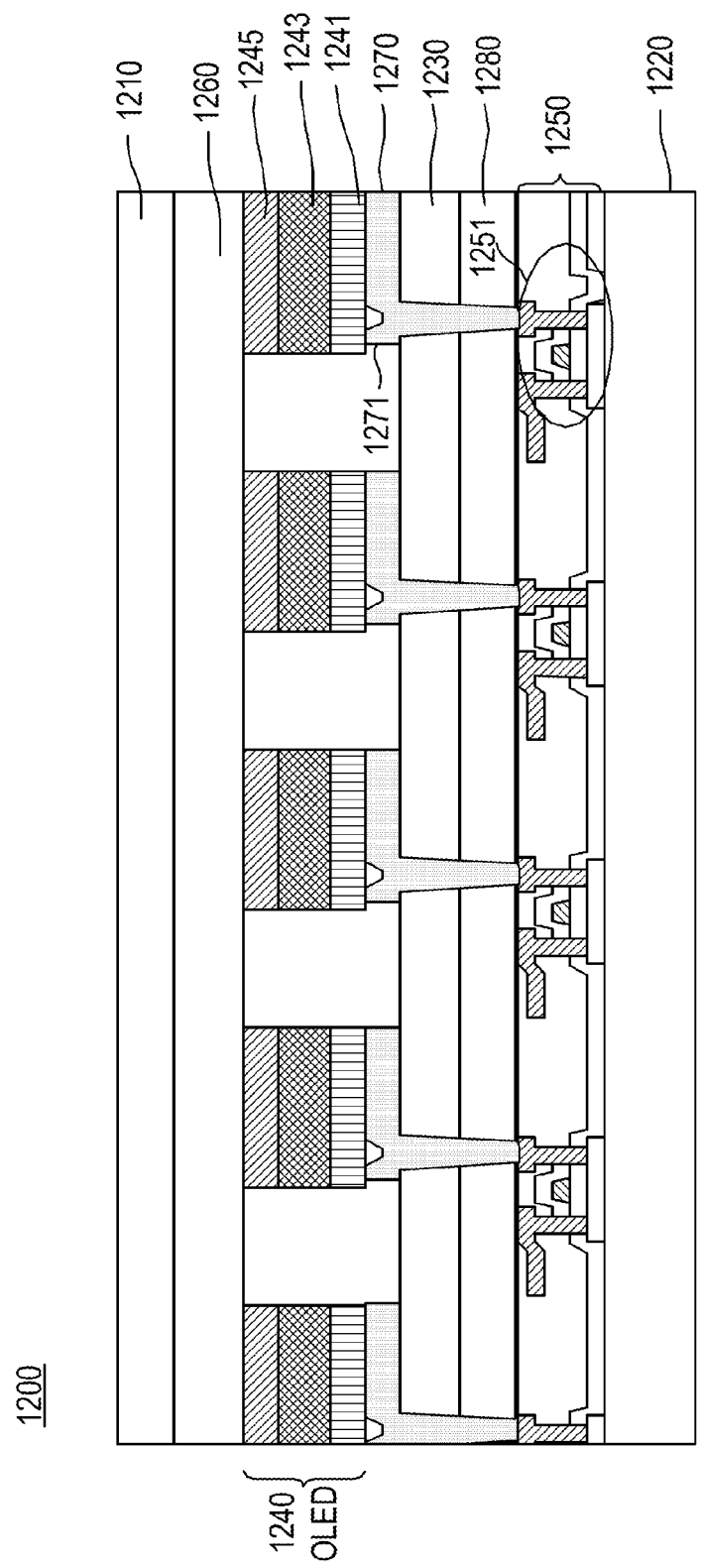
FIG. 12 is a stackup diagram of the high-accuracy in-cell touch panel structure of narrow border in accordance with another embodiment of the invention.

FIG. 12 is a stackup diagram of the high-accuracy in-cell touch panel structure of narrow border 1200 according to another embodiment of the invention. As shown, the high-accuracy in-cell touch panel structure of narrow border 1200 includes an upper substrate 1210, a lower substrate 1220, a sensing electrode layer 1230, an OLED layer 1240, a thin film transistor layer 1250, a cathode layer 1260, an anode layer 1270, and an insulation layer 1280.

The upper substrate 1210 and the lower substrate 1220 are preferably glass substrates or plastic substrates. The upper substrate 1210 and the lower substrate 1220 are parallel to each other. The OLED layer 1240 is disposed between the upper and lower substrates 1210, 1220.

In this embodiment, on the thin film transistor layer 1250, there are N first conductor line units 50-1, 50-2, . . . , 50-N arranged along the second direction, each being arranged in the first direction. On the sensing electrode layer 1230, there are M second conductor line units 40-1, 40-2, . . . , 40-M and N connection lines 41-1, 41-2, . . . , 41-N arranged along the first direction, each being arranged in the second direction, where M and N are each a positive integer, so as to form a sensing touch pattern structure as shown in FIG. 3. The arrangement for the M second conductor line units 40-1, 40-2, . . . , 40-M, the N connection lines 41-1, 41-2, . . . , 41-N and the N first conductor line units 50-1, 50-2, . . . , 50-N is the same as the aforementioned description of the first embodiment, shown in FIG. 3 to FIG. 10. Thus, a detailed description therefor is deemed unnecessary.

The OLED layer 1240 includes an electrical hole transporting layer 1241, an emitting layer 1243, and an electron transporting layer 1245.

The thin film transistor layer 1250 is disposed at one side of the lower substrate 1220 that faces the OLED layer 1240. The thin film transistor layer 1250 includes a plurality of gate lines (not shown), a plurality of source lines (not shown), N first conductor line units 50-1, 50-2, . . . , 50-N arranged in the first direction, and a plurality of pixel driving circuits 1251. Each pixel driving circuit 1251 corresponds to a pixel. Based on a display pixel signal and a display driving signal, a corresponding pixel driving circuit 1251 is driven so as to proceed with display operation.

According to different designs of the pixel driving circuit 1251, such as 2T1C being a pixel driving circuit formed with two thin film transistors and a storage capacitor, and 6T2C being a pixel driving circuit formed with six thin film transistors and two storage capacitors, the gate of at least one thin film transistor in the pixel driving circuit 1251 is connected to a gate line (not shown). According to different designs of driving circuit, a source/drain of at least one thin film transistor in a control circuit is connected to a source line (not shown) and a source/drain of at least one thin film transistor in pixel driving circuit 1251 is connected to a corresponding anode pixel electrode 1271 of the anode layer 1270.

The sensing electrode layer 1230 is disposed at one side of the thin film transistor layer 1250 that faces the OLED layer 1240. On the sensing electrode layer 1230, there are M second conductor line units 40-1, 40-2, . . . , 40-M and N connection lines 41-1, 41-2, . . . , 41-N configured for sensing an approaching external object according to a touch driving signal. An insulation layer 1280 may be arranged between the sensing electrode layer 1230 and the thin film transistor layer 1250.

Each of the N first conductor line units 50-1, 50-2, . . . , 50-N makes use of a corresponding i-th connection line of the N connection lines 41-1, 41-2, . . . , 41-N to be extended to one edge of the high-accuracy in-cell touch panel structure of narrow border 1200, where i is a positive integer and $1 \leq i \leq N$. The N first conductor line units 50-1, 50-2, . . . , 50-N, the M second conductor line units 40-1, 40-2, . . . , 40-M, and the N connection lines 41-1, 41-2, . . . , 41-N are disposed at positions corresponding to the positions of the plurality of gate lines and the plurality of source lines.

The anode layer 1270 is disposed at one side of the thin film transistor layer 1250 facing the OLED layer 1240. The anode layer 1270 includes a plurality of anode pixel electrodes 1271. Each of the anode pixel electrodes 1271 is corresponding to one pixel driving transistor of the pixel driving circuit 1251 of the thin film transistor 1250. That is, each of the anode pixel electrodes 1271 is connected to a source/drain of the pixel driving transistor of the corresponding pixel driving circuit 1251, so as to form a pixel electrode of a specific color, for example a red pixel electrode, a green pixel electrode, or a blue pixel electrode.

The cathode layer 1260 is disposed at one side of the upper substrate 1210 facing the OLED layer 1240 and between the upper substrate 1210 and the OLED layer 1240. The cathode layer 1260 is formed with metal material, preferably metal material with thickness of being less than 50 nm. The metal material is selectively to be alloy of aluminum, silver, magnesium, calcium, potassium, lithium, indium, or combination of lithium fluoride, magnesium fluoride, lithium oxide and aluminum. Due to the thickness of the cathode layer 1260 being less than 50 nm, the light generated by the OLED layer 1240 can pass through it, so as to show images on the upper substrate 1210. The cathode layer 1260 is intact piece electrical connection, so that it can be used as a shielding. Moreover, the cathode layer 1260 also receives the current coming from the anode pixel electrode 1271.

In the prior art, the electrode pads made of ITO have an average light penetration rate of about 90%. In the present invention, the M second conductor line units 40-1, 40-2, . . . , 40-M, the N connection lines 41-1, 41-2, . . . , 41-N, and the N first conductor line units 50-1, 50-2, . . . , 50-N are disposed corresponding to the positions of the plurality of gate lines and the plurality of source lines, so that the light penetration rate is not influenced. Therefore, the light penetration rate of the present invention is much better than that of the prior art. Accordingly, in comparison with the prior touch display panel, the high-accuracy in-cell touch panel structure of narrow border in accordance with the present invention shall have a higher brightness.

Figure 1:
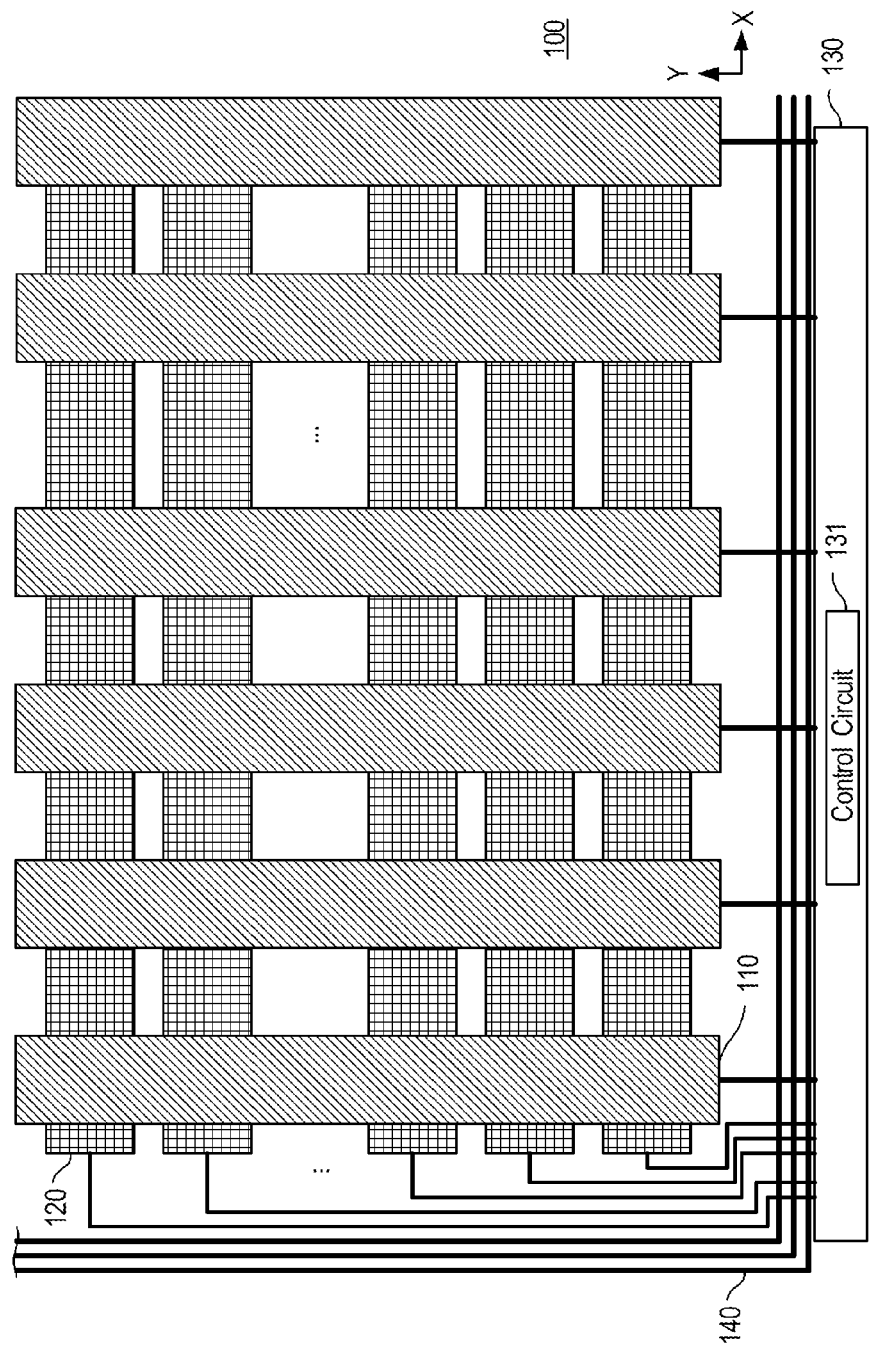
FIG. 1 is a schematic diagram of a prior touch panel structure.

In view of the foregoing, it is known that the prior design as in FIG. 1 shall increase the border width of the touch panel and thus is not suitable for the trend of narrow border. When the high-accuracy in-cell touch panel structure of narrow border in accordance with the present invention is embedded into a LCD display or an OLED display panel, the border of the LCD touch display panel or the OLED touch display panel becomes narrower.

Furthermore, when ITO material is used as a bridge for connecting two ITO electrode points, it is likely to have broken points or defective electrical signals at the bridges due to that the expandability of ITO material is not as good as that of metal. On the other hand, if metal is used as a bridge for connecting two ITO electrode points, it is likely to have defective electrical signals at the bridges due to that metal and ITO are heterogeneous materials, resulting in negatively affecting the accuracy of touch detection.

However, in the present invention, the M second conductor line units 40-1, 40-2, . . . , 40-M, the N first conductor line units 50-1, 50-2, . . . , 50-N and the N connection lines 41-1, 41-2, . . . , 41-N are all made of metal, which has a better conductivity in comparison with the prior art, so as to easily transmit the sensed signals of the connection lines to the control circuit 610, thereby allowing the control circuit 610 to accurately compute the touch coordinates. Accordingly, it is known that the present invention has a better light penetration rate in comparison with the prior art and can lower the manufacturing cost by avoiding the use of expensive ITO material, which is suitable for the touch display panel of narrow border.

Although the present invention has been explained in relation to its preferred embodiment, it is to be understood that many other possible modifications and variations can be made without departing from the spirit and scope of the invention as hereinafter claimed.

What is claimed is:

1. A high-accuracy in-cell touch panel structure of narrow border, comprising:
   an upper substrate;
   a lower substrate parallel to the upper substrate;
   a liquid crystal layer configured between the upper substrate and the lower substrates;
   a thin film transistor layer disposed at one side of the lower substrate facing the liquid crystal layer, the thin film transistor layer including a plurality of gate lines, a plurality of source lines, and N first conductor line units arranged in a first direction, wherein N is a positive integer; for driving a corresponding pixel driving circuit according to a display pixel signal and a display driving signal;
   a sensing electrode layer disposed at one side of the thin film transistor layer facing the liquid crystal layer, the sensing electrode layer having M second conductor line units and N connection lines arranged in a second direction for sensing an approaching external object, where M and N are each a positive integer;
   wherein each of the N first conductor line units makes use of a corresponding i-th connection line to be extended to one edge of the high-accuracy in-cell touch panel structure of narrow border, where i is a positive integer and 1≤i≤N, and the N first conductor line units, the M second conductor line units, and the N connection lines are disposed corresponding to positions of the plurality of gate lines and source lines.

2. The high-accuracy in-cell touch panel structure of narrow border as claimed in claim 1, wherein each of the M second conductor line units is extended to the same edge of the high-accuracy in-cell touch panel structure of narrow border through a corresponding metal wire for being further connected to a flexible circuit board.

3. The high-accuracy in-cell touch panel structure of narrow border as claimed in claim 2, wherein the N connection lines are made of conductive metal material.

4. The high-accuracy in-cell touch panel structure of narrow border as claimed in claim 3, wherein each of the M second conductor line units is composed of plural metal sensing lines, and each of the N first conductor line units is composed of plural metal sensing lines.

5. The high-accuracy in-cell touch panel structure of narrow border as claimed in claim 4, wherein the plural metal sensing lines of each of the M second conductor line units form a quadrilateral region, and the plural metal sensing lines of each of the N first conductor line units form a quadrilateral region, such that the metal sensing lines in each quadrilateral region are electrically connected together, while any two of the quadrilateral regions are not connected with each other.

6. The high-accuracy in-cell touch panel structure of narrow border as claimed in claim 5, wherein the first direction is vertical with the second direction.

7. The high-accuracy in-cell touch panel structure of narrow border as claimed in claim 6, wherein each of the N connection lines is disposed between two second conductor line units.

8. The high-accuracy in-cell touch panel structure of narrow border as claimed in claim 7, wherein the quadrilateral region has a shape of rectangle or square.

9. The high-accuracy in-cell touch panel structure of narrow border as claimed in claim 8, wherein the metal sensing lines in each quadrilateral region formed by the plural metal sensing lines of each of the M second conductor line units and the N first conductor line units are made of conductive metal material or alloy material.

10. The high-accuracy in-cell touch panel structure of narrow border as claimed in claim 9, wherein the conductive metal material is selectively to be chromium, barium, aluminum, silver, copper, titanium, nickel, tantalum, cobalt, tungsten, magnesium, calcium, potassium, lithium, indium, or a mixture of LiF, MgF2 or Li2O.

11. The high-accuracy in-cell touch panel structure of narrow border as claimed in claim 1, wherein the thin film transistor layer includes:
a gate line sub-layer having a plurality of gate lines and a plurality of wiring segments, the plurality of gate lines being arranged in the first direction and the plurality of wiring segments being arranged in the second direction, the plurality of wiring segments arranged in the second direction being separated by the plurality of gate lines; and
a source line sub-layer disposed at one side of the gate line sub-layer facing the liquid crystal layer and having a plurality of source lines and a plurality of wiring segments, the plurality of source lines being arranged in the second direction and the plurality of wiring segments being arranged in the first direction, the plurality of wiring segments arranged in the first direction being separated by the plurality of source lines.

12. The high-accuracy in-cell touch panel structure of narrow border as claimed in claim 11, wherein the plurality of wiring segments arranged in the second direction and the plurality of wiring segments arranged in the first direction are disposed corresponding to positions of the plurality of gate lines and the plurality of source lines.

13. The high-accuracy in-cell touch panel structure of narrow border as claimed in claim 12, wherein each of the plurality of wiring segments arranged in the second direction has two ends respectively having a first extension part and a second extension part arranged in the first direction, and each of the plurality of wiring segments arranged in the first direction has two ends respectively having a first extension part and a second extension part arranged in the second direction, where the extension parts arranged in the first direction are partially overlapped with the extension parts arranged in the second direction.

14. The high-accuracy in-cell touch panel structure of narrow border as claimed in claim 13, wherein the extension parts are partially overlapped and thus electrically connected thereby, so as to allow the plurality of wiring segments arranged in the second direction and the plurality of wiring segments arranged in the first direction to form the N first conductor line units of the thin film transistor layer.

15. The high-accuracy in-cell touch panel structure of narrow border as claimed in claim 14, further comprising:
a black matrix layer arranged on one side of the upper substrate facing the liquid crystal layer, the black matrix layer being composed of a plurality of opaque lines;
a color filter layer arranged on one side of the black matrix layer facing the liquid crystal layer;
a common electrode layer disposed between the upper substrate and the lower substrate;
a first polarizer layer arranged on one side the upper substrate opposite to the other side of the upper substrate facing the liquid crystal layer; and
a second polarizer layer arranged on one side of the lower substrate opposite to the other side of the lower substrate facing the liquid crystal layer.

16. The high-accuracy in-cell touch panel structure of narrow border as claimed in claim 15, wherein the plurality of opaque lines are disposed corresponding to positions of the plurality of gate lines and source lines.

17. A high-accuracy in-cell touch panel structure of narrow border, comprising:
an upper substrate;
a lower substrate parallel to the upper substrate;
an OLED layer configured between the upper substrate and the lower substrate;
a thin film transistor layer disposed at one side of the lower substrate facing the OLED layer, the thin film transistor layer including a plurality of gate lines, a plurality of source lines, and N first conductor line units arranged in a first direction, wherein N is a positive integer; for driving a corresponding pixel driving circuit according to a display pixel signal and a display driving signal;
a sensing electrode layer disposed at one side of the thin film transistor layer facing the OLED layer, the sensing electrode layer having M second conductor line units and N connection lines arranged in a second direction for sensing an approaching external object, where M and N are each a positive integer;

a cathode layer disposed at one side of the upper substrate facing the OLED layer, the cathode layer being formed with metal material; and an anode layer disposed at one side of the thin film transistor layer facing the OLED layer, the anode layer including a plurality of anode pixel electrodes, each of the plurality of anode pixel electrodes being connected to a source or drain of a corresponding pixel driving transistor;

wherein each of the N first conductor line units makes use of a corresponding i-th connection line to be extended to one edge of the high-accuracy in-cell touch panel structure of narrow border, where i is a positive integer and 1≤i≤N, and the N first conductor line units, the M second conductor line units, and the N connection lines are disposed corresponding to positions of the plurality of gate lines and source lines.

18. The high-accuracy in-cell touch panel structure of narrow border as claimed in claim 17, wherein each of the M second conductor line units is extended to the same edge of the high-accuracy in-cell touch panel structure of narrow border through a corresponding metal wire for being further connected to a flexible circuit board.

19. The high-accuracy in-cell touch panel structure of narrow border as claimed in claim 18, wherein each of the M second conductor line units is composed of plural metal sensing lines, and each of the N first conductor line units is composed of plural metal sensing lines.

20. The high-accuracy in-cell touch panel structure of narrow border as claimed in claim 19, wherein the plural metal sensing lines of each of the M second conductor line units form a quadrilateral region, and the plural metal sensing lines of each of the N first conductor line units form a quadrilateral region, such that the metal sensing lines in each quadrilateral region are electrically connected together, while any two of the quadrilateral regions are not connected with each other, each of the N connection lines is disposed between two second conductor line units and the first direction is vertical with the second direction.

21. The high-accuracy in-cell touch panel structure of narrow border as claimed in claim 20, wherein the quadrilateral region has a shape of rectangle or square.

22. The high-accuracy in-cell touch panel structure of narrow border as claimed in claim 21, wherein the thin film transistor layer includes:

a gate line sub-layer having a plurality of gate lines and a plurality of wiring segments, the plurality of gate lines being arranged in the first direction and the plurality of wiring segments being arranged in the second direction, the plurality of wiring segments arranged in the second direction being separated by the plurality of gate lines; and a source line sub-layer disposed at one side of the gate line sub-layer facing the liquid crystal layer and having a plurality of source lines and a plurality of wiring segments, the plurality of source lines being arranged in the second direction and the plurality of wiring segments being arranged in the first direction, the plurality of wiring segments arranged in the first direction being separated by the plurality of source lines.

23. The high-accuracy in-cell touch panel structure of narrow border as claimed in claim 22, wherein the plurality of wiring segments arranged in the second direction and the plurality of wiring segments arranged in the first direction are disposed corresponding to positions of the plurality of gate lines and the plurality of source lines.

24. The high-accuracy in-cell touch panel structure of narrow border as claimed in claim 23, wherein each of the plurality of wiring segments arranged in the second direction has two ends respectively having a first extension part and a second extension part arranged in the first direction, and each of the plurality of wiring segments arranged in the first direction has two ends respectively having a first extension part and a second extension part arranged in the second direction, where the extension parts arranged in the first direction are partially overlapped with the extension parts arranged in the second direction.

25. The high-accuracy in-cell touch panel structure of narrow border as claimed in claim 24, wherein the extension parts are partially overlapped and thus electrically connected thereby; so as to allow the plurality of wiring segments arranged in the second direction and the plurality of wiring segments arranged in the first direction to form the N first conductor line units of the thin film transistor layer.

* * * * *